(12) United States Patent
Edwards et al.

(10) Patent No.: US 6,909,455 B1
(45) Date of Patent: Jun. 21, 2005

(54) SYSTEM, METHOD AND ARTICLE OF MANUFACTURE FOR TRACKING A HEAD OF A CAMERA-GENERATED IMAGE OF A PERSON

(75) Inventors: Jeffrey L. Edwards, Palo Alto, CA (US); Katerina H. Nguyen, Palo Alto, CA (US)

(73) Assignee: Electric Planet, Inc., Palo Alto, CA (US)

( * ) Notice: Subject to any disclaimer, the term of this patent is extended or adjusted under 35 U.S.C. 154(b) by 320 days.

(21) Appl. No.: 10/353,858

(22) Filed: Jan. 28, 2003

Related U.S. Application Data

(63) Continuation of application No. 09/364,859, filed on Jul. 30, 1999, now Pat. No. 6,545,706.

(51) Int. Cl.[7] .................................................. H04N 7/18
(52) U.S. Cl. ........................ 348/169; 348/170; 348/20
(58) Field of Search ................................ 348/169–171, 348/19–21, 70–80

(56) References Cited

U.S. PATENT DOCUMENTS

| | | |
|---|---|---|
| 4,843,568 A | 6/1989 | Krueger et al. |
| 5,148,477 A | 9/1992 | Neely et al. |
| 5,384,912 A | 1/1995 | Ogrinc et al. |
| 5,454,043 A | 9/1995 | Freeman |
| 5,469,536 A | 11/1995 | Blank |
| 5,534,917 A | 7/1996 | MacDougall |
| 5,548,659 A | 8/1996 | Okamoto |
| 5,570,113 A | 10/1996 | Zetts |
| 5,581,276 A | 12/1996 | Cipolla et al. |
| 5,623,587 A | 4/1997 | Bulman |
| 5,631,697 A | 5/1997 | Nishimura et al. |
| 5,767,867 A | 6/1998 | Hu |
| 5,781,198 A | 7/1998 | Korn |
| 5,790,124 A | 8/1998 | Fischer et al. |
| 5,802,220 A | 9/1998 | Black et al. ................. 382/100 |
| 6,154,559 A | 11/2000 | Beardsley ................... 340/576 |
| 6,301,370 B1 | 10/2001 | Steffens et al. ............... 342/90 |

OTHER PUBLICATIONS

Crow, F. C., "Summed–Area Tables for Texture Mapping," Computer Graphics, vol. 18(3), 207–212, Jul., 1984.
Aggarwal, J. K., Cai, Q. "Human Motion Analysis: A Review," IEEE Nonrigid and Articulated Motion Workshop Proceedings, 90–102, (1997).
Huang, Chu–Lin, Wu, Ming–Shan, "A Model–based Complex Background Gesture Recognition System," IEEE International Conference on Systems, Man and Cybernetics, vol. 1 pp. 93–98, Oct. 1996.
Cortes, C., Vapnik, V., "Support–Vector Networks," Machine Learning, vol. 20, pp. 273–297, (1995).
GMD Digital Media Lab: The Virtual Studio; http://viswiz.gmd.de/DML/vst/vst.html.
Swain, M. J., Ballard, D. H., "Indexing Via Color Histograms," Third International Conference on Computer Vision, pp. 390–393, Dec., 1990.
Review: Game Boy Camera, Jul. 15th, 1998, http://www.gameweek.com/reviews/july15/gbc.html.
Barbie PhotoDesigner w/Digital Camera, Box, http://www.actioncd.com/ktkt0126.asp.

Primary Examiner—Andy Rao
(74) Attorney, Agent, or Firm—Van Pelt, Yi & James LLP

(57) ABSTRACT

A system, method and article of manufacture are provided for tracking a head portion of a person image in video images. Upon receiving video images, a first head tracking operation is executed for generating a first confidence value. Such first confidence value is representative of a confidence that a head portion of a person image in the video images is correctly located. Also executed is a second head tracking operation for generating a second confidence value representative of a confidence that the head portion of the person image in the video images is correctly located. The first confidence value and the second confidence value are then outputted. Subsequently, the depiction of the head portion of the person image in the video images is based on the first confidence value and the second confidence value.

27 Claims, 15 Drawing Sheets

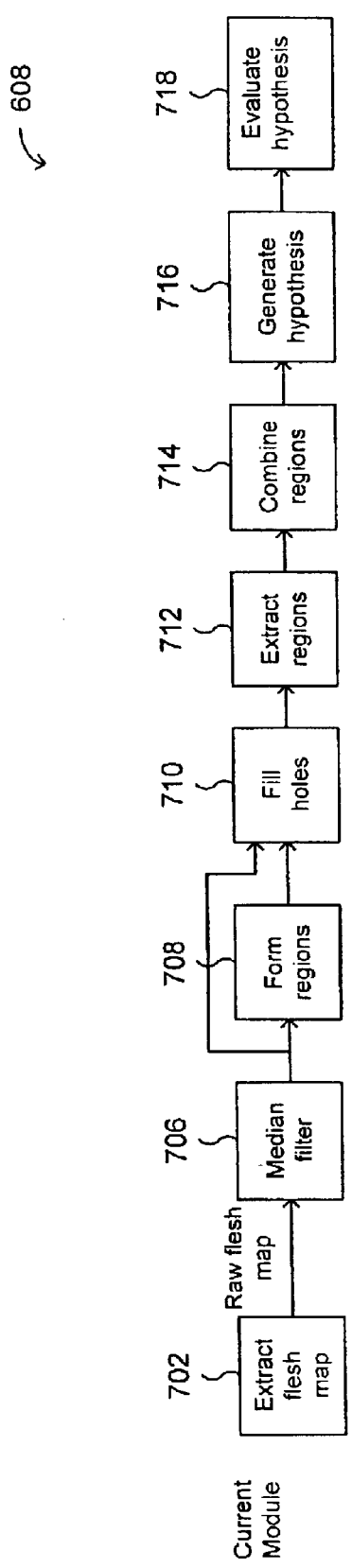
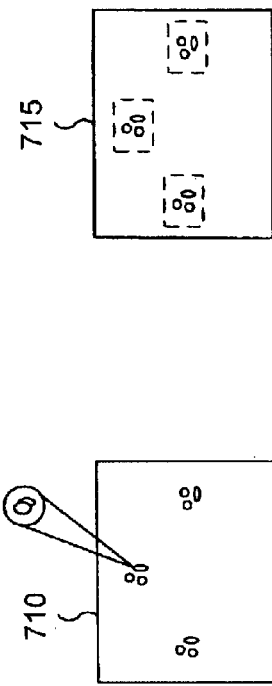
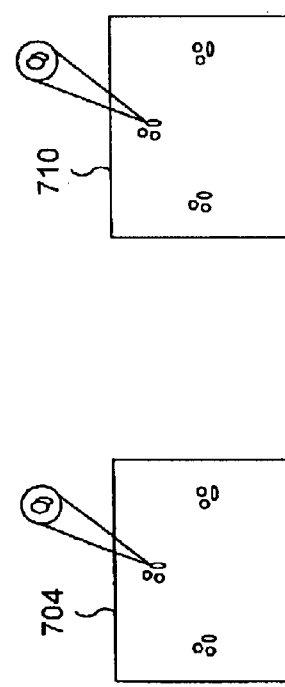
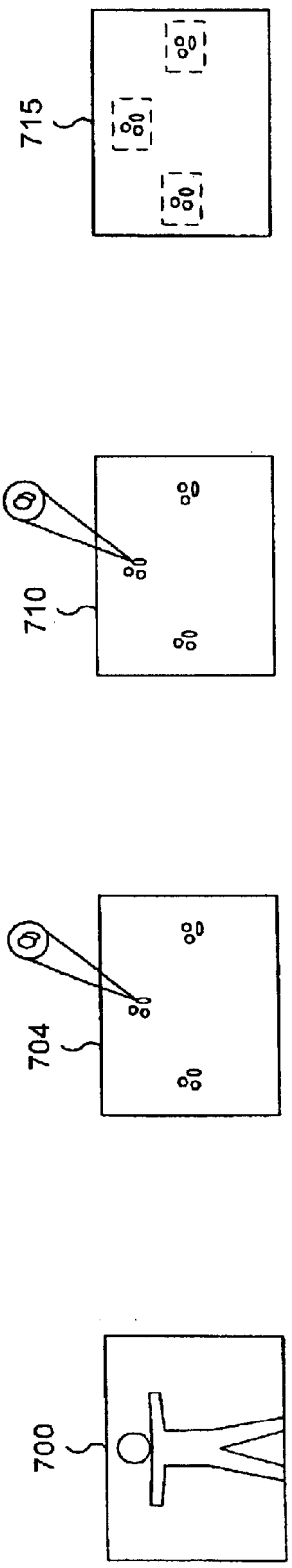
Figure 7A  Figure 7B  Figure 7C  Figure 7D
Figure 7

SYSTEM, METHOD AND ARTICLE OF MANUFACTURE FOR TRACKING A HEAD OF A CAMERA-GENERATED IMAGE OF A PERSON

CROSS-REFERENCE TO RELATED APPLICATIONS

This is a continuation of U.S. patent application Ser. No. 09/364,859, entitled "SYSTEM, METHOD AND ARTICLE OF MANUFACTURE FOR TRACKING A HEAD OF A CAMERA-GENERATED IMAGE OF A PERSON" filed Jul. 30, 1999, now U.S. Pat. No. 6,545,706, and listing Jeffrey L. Edwards and Katerina H. Nguyen as inventors and which is incorporated herein by reference for all purposes.

BACKGROUND OF THE INVENTION

1. The Field of the Invention

The present invention relates to displaying video images generated by a camera on a display, and more particularly to tracking a head portion of a person image in camera-generated video images.

2. The Relevant Art

It is common for personal computers to be equipped with a camera for receiving video images as input. Conventionally, such camera is directed toward a user of the personal computer so as to allow the user to view himself or herself on a display of the personal computer during use. To this end, the user is permitted to view real-time images that can be used for various purposes.

One purpose for use of a personal computer-mounted camera is to display an interaction between camera-generated video images and objects generated by the personal computer and depicted on the associated display. In order to afford this interaction, a current position of the user image must be identified. This includes identifying a current position of the body parts of the user image, including the head. Identification of an exact current location of the user image and his or her body parts is critical for affording accurate and realistic interaction with objects in the virtual computer-generated environment. In particular, it is important to track a head portion of the user image since this specific body part is often the focus of the most attention.

Many difficulties arise, however, during the process of identifying the current position of the head portion of the user image. It is often very difficult to discern the head portion when relying on a single technique. For example, when identifying the location of a head portion using shape, color, motion etc., portions of the background image and the remaining body parts of the user image may be confused with the head. For example, a flesh coloring of a hand may be mistaken for features of the head.

SUMMARY OF THE INVENTION

A system, method and article of manufacture are provided for tracking a head portion of a person image in video images. Upon receiving video images, a first head tracking operation is executed for generating a first confidence value. Such first confidence value is representative of a confidence that a head portion of a person image in the video images is correctly located. Also executed is a second head tracking operation for generating a second confidence value representative of a confidence that the head portion of the person image in the video images is correctly located. The first confidence value and the second confidence value are then outputted. Subsequently, the depiction of the head portion of the person image in the video images is based on the first confidence value and the second confidence value.

In one embodiment of the present invention, the first head tracking operation begins with subtracting a background image from the video images in order to extract the person image. Further, a mass-distribution histogram may be generated that represents the extracted person image. A point of separation is then identified between a torso portion of the person image and the head portion of the person image.

Next, the first head tracking operation continues by identifying a top of the head portion of the person image. This may be accomplished by performing a search upwardly from the point of separation between the torso portion and the head portion of the person image. Subsequently, sides of the head portion of the person image are also identified. As an option, the first head tracking operation may track the head portion of the person image in the video images using previous video images including the head portion of the person image.

In one embodiment, the second head tracking operation may begin by identifying an initial location of the head portion of the person image in the video images. Thereafter, a current location of the head portion of the person image may be tracked starting at the initial location. As an option, the initial location of the head portion of the person image may be identified upon each instance that the second confidence value falls below a predetermined amount. By this feature, the tracking is "restarted" when the confidence is low that the head is being tracked correctly. This ensures improved accuracy during tracking.

As an option, the initial location of the head portion of the person image may be identified based on the detection of a skin color in the video images. This may be accomplished by extracting a flesh map; filtering the flesh map; identifying distinct regions of flesh color on the flesh map; ranking the regions of flesh color on the flesh map; and selecting at least one of the regions of flesh color as the initial location of the head portion of the person image based on the ranking. During such procedure, holes in the regions of flesh color on the flesh map may be filled. Further, the regions of flesh color on the flesh map may be combined upon meeting a predetermined criteria.

In a similar manner, the current location of the head portion of the person image may be tracked based on the detection of a skin color in the video images. Such technique includes extracting a sub-window of the head portion of the person image in the video images; forming a color model based on the sub-window; searching the video images for a color similar to the color model; and estimating the current location of the head portion of the person image based on the search.

In one embodiment, the module that identifies the initial location of the head portion of the person image and the module that identifies the current location of the head portion of the person image may work together. In particular, while tracking the current location of the head portion of the person image, a flesh map may be obtained. Thereafter, the flesh map may be used during subsequent identification of an initial location of the head portion of the person image when the associated confidence level drops below the predetermined amount.

Similar to using the skin color, the initial location of the head portion of the person image may be also be identified based on the detection of motion in the video images. Such identification is achieved by creating a motion distribution map from the video images; generating a histogram based on the motion distribution map; identifying areas of motion using the histogram; and selecting at least one of the areas of motion as being the initial location of the head portion of the person image.

Similarly, the current location of the head portion of the person image may be tracked based on the detection of motion in the video images. This may be accomplished by determining a search window based on a previous location of the head portion of the person image; creating a motion distribution map within the search window; generating a histogram based on the distribution motion map; identifying areas of motion using the histogram; and selecting at least one of the areas of motion as being the initial location of the head portion of the person image.

These and other aspects and advantages of the present invention will become more apparent when the Description below is read in conjunction with the accompanying Drawings.

BRIEF DESCRIPTION OF THE DRAWINGS

The present invention will be readily understood by the following detailed description in conjunction with the accompanying drawings, with like reference numerals designating like elements.

FIG. 7 shows a flow chart for a process of the present invention associated with the skin detection operation 604 of FIG. 6;

FIG. 7A illustrates a person image of the video images, as inputted into the extract flesh map operation 702 of FIG. 7;

FIG. 7B illustrates a raw flesh map, as outputted from the extract flesh map operation 702 of FIG. 7;

FIG. 7C illustrates a flesh map, as outputted from the fill holes operation 710 of FIG. 7;

FIG. 7D illustrates a flesh map, as outputted from the combine regions operation 714 of FIG. 7;

DETAILED DESCRIPTION OF THE PREFERRED EMBODIMENTS

The present invention affords a technique for tracking a head portion of a person image in camera-generated video images. This is accomplished using at least two head tracking operations that each track the head portion of the person image in camera-generated video images. In addition, each head tracking operation further generates a confidence value that is indicative of a certainty that the head portion of the person image is being tracked correctly. This information may be used by an associated application for depicting an interaction between the head and a virtual computer-generated environment.

Figure 1:
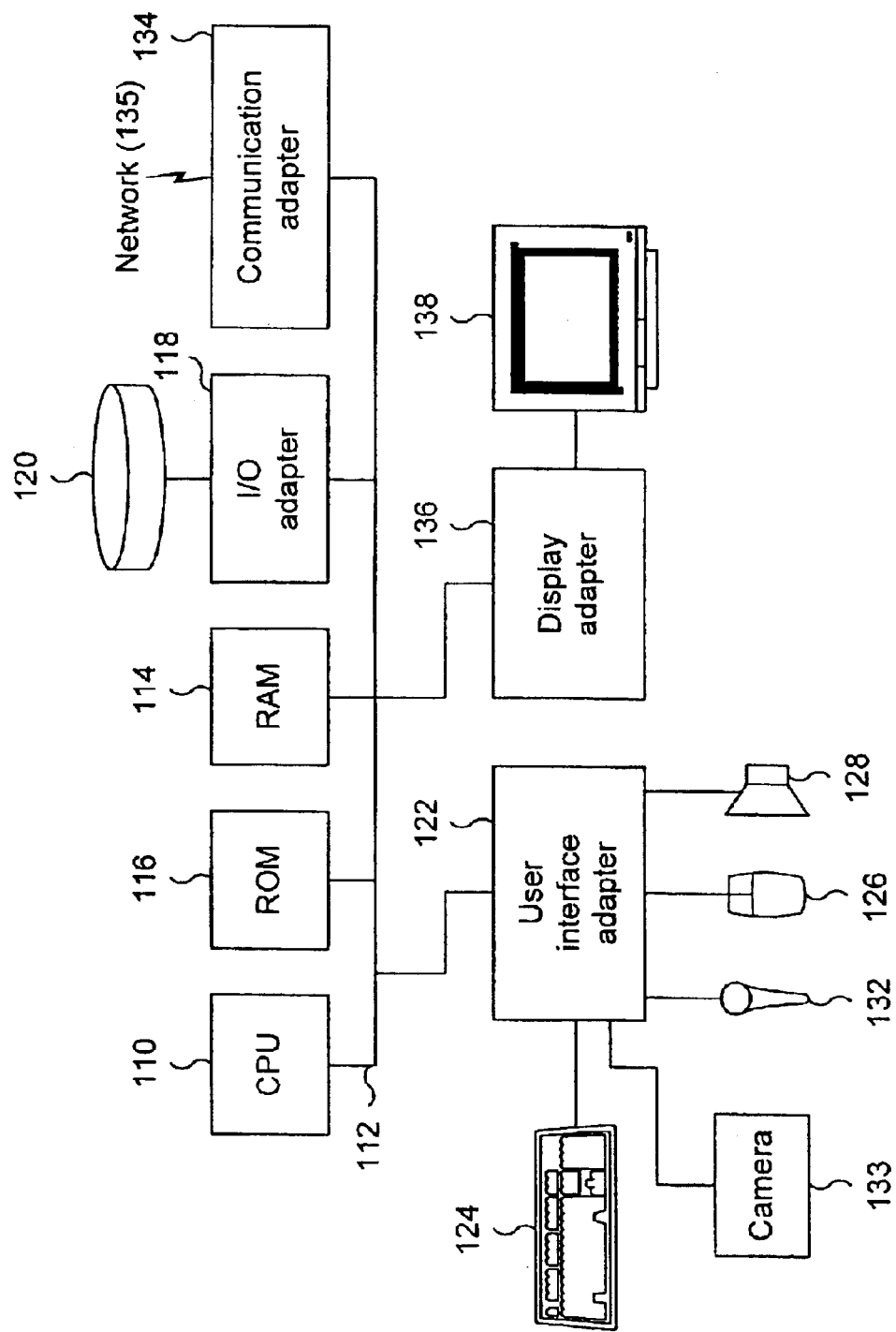
FIG. 1 is a schematic diagram illustrating an exemplary hardware implementation in accordance with one embodiment of the present invention.

FIG. 1 shows an exemplary hardware configuration in accordance with one embodiment of the present invention where a central processing unit 110, such as a microprocessor, and a number of other units interconnected via a system bus 112. The hardware configuration shown in FIG. 1 includes Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, a camera 133 and/or other user interface devices to the bus 112, communication adapter 134 for connecting the hardware configuration to a communication network 135 (e.g., a data processing network) and a display adapter 136 for connecting the bus 112 to a display device 138.

The hardware configuration typically has resident thereon an operating system such as the Microsoft Windows NT or Windows/98/2000 Operating System (OS), the IBM OS/2 operating system, the MAC OS, or UNIX operating system. Those skilled in the art will appreciate that the present invention may also be implemented on platforms and operating systems other than those mentioned. For example, a game system such as a SONY PLAYSTATION or the like may be employed. Yet another example includes an application specific integrated circuit (ASIC) or any other type of hardware logic that is capable of executing the processes of the present invention. Further, in one embodiment, the various processes employed by the present invention may be implemented using C++ programming language or the like.

Figure 2:
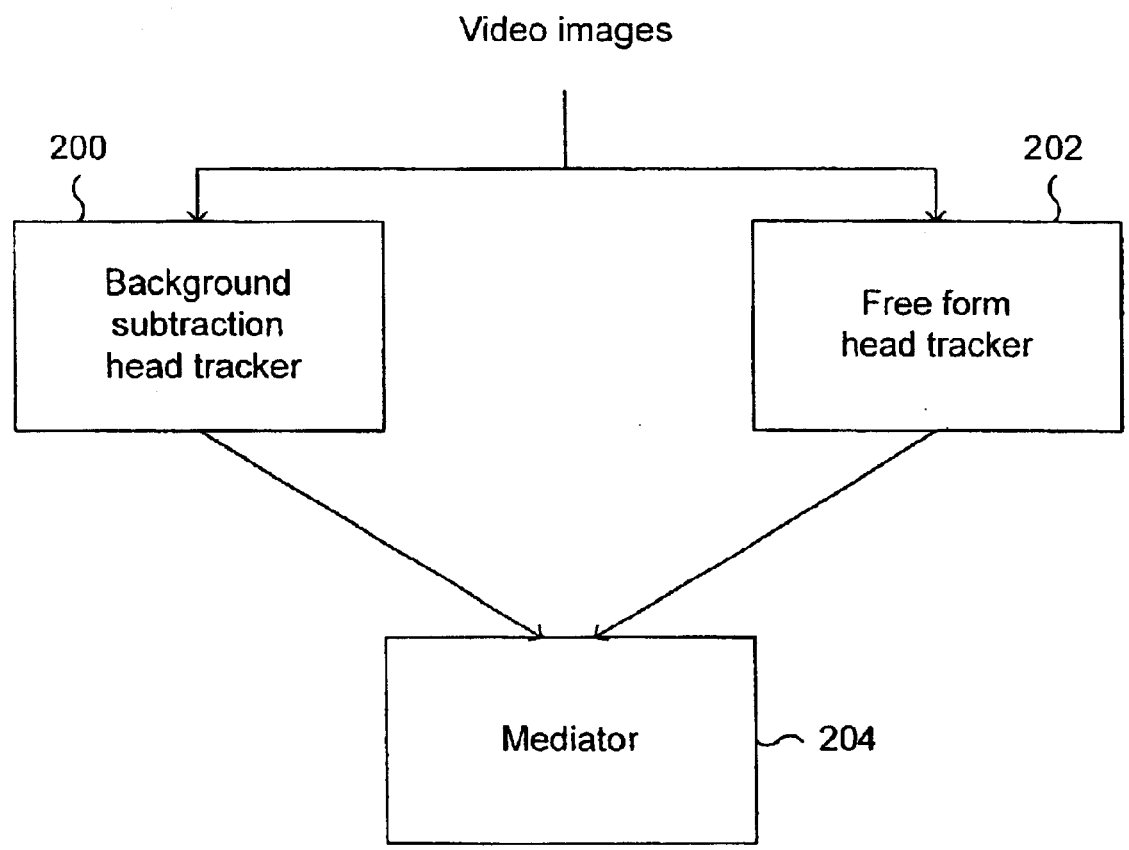
FIG. 2 illustrates a flowchart of a process for tracking a head portion of a person image in camera-generated video images in accordance with one embodiment of the present invention.

FIG. 2 illustrates a flowchart of a process for tracking a head portion of a person image in camera-generated video images in accordance with one embodiment of the present invention. As shown, upon receiving video images generated by a camera, a first head tracking operation 200 is executed for generating a first confidence value. It should be noted that the video images may be generated by the camera at any time and not necessarily immediately before being received by the head tracking operation. Further, the video images may be partly computer enhanced or completely computer generated per the desires of the user.

The first confidence value generated by the first head tracking operation is representative of a confidence that a head portion of a person image in the camera-generated video images is located. Also executed is a second head tracking operation 202 for generating a second confidence value representative of a confidence that the head portion of the person image in the camera-generated video images is located The first confidence value and the second confidence value may then be made available for use by various applications in operation 204. Such applications may decide whether the head portion of the person image has moved based on the confidence values. Logic such as an AND operation, an OR operation, or any other more sophisticated logic may be employed to decide whether the results of the first head tracking operation and/or the second head tracking operation are indicative of true head movement.

For example, if at least one of the head tracking operations indicates a high confidence of head movement, it may be decided to assume that the head has moved. On the other hand, if both head tracking operations indicate a medium confidence of movement, it may be assumed with similar certainty that the head has moved. If it is decided to assume that the head has moved, an interaction may be shown between the video images generated by the camera and the virtual computer-generated environment.

Figure 3:
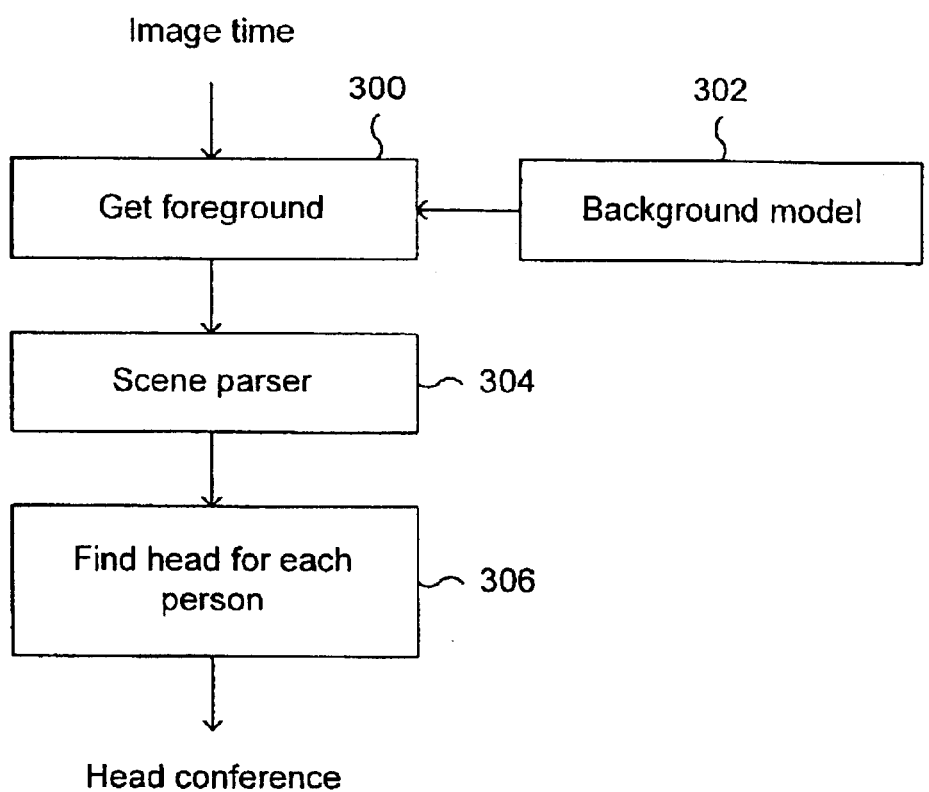
FIG. 3 shows a flow chart for a first head tracking operation that tracks a head portion of a person image in camera-generated video images using background subtraction in accordance with one embodiment of the present invention.

FIG. 3 shows a flow chart for a process associated with the first head tracking operation 202. In use, the first head tracking operation 202 tracks a head portion of a person image in camera-generated video images using background subtraction. As shown, in operation 300, the first head tracking operation begins by obtaining a foreground by subtracting a background image from the video images generated by the camera. This may be accomplished by first storing the background image, or model 302, without the presence of the person image. Then, a difference may be found between a current image and the background image. More information on the background model and background subtraction may be found in a patent application entitled "METHOD AND APPARATUS FOR MODEL-BASED COMPOSITING" filed Oct. 15, 1997 under application Ser. No. 08/951,089 which is incorporated herein by reference in its entirety.

Next, in operation 304, a "scene parsing" process is carried which identifies a location and a number of person images in the video images. This is accomplished by utilizing a person image, or foreground mask(s), that is generated by the background subtraction carried out in operation 300 of FIG. 4. Addition information will be set forth regarding the "scene parsing" process with reference to FIG. 4. Finally, the head portion is found for each person image in operation 306 that will be set forth in greater detail with reference to FIG. 5.

Figure 4:
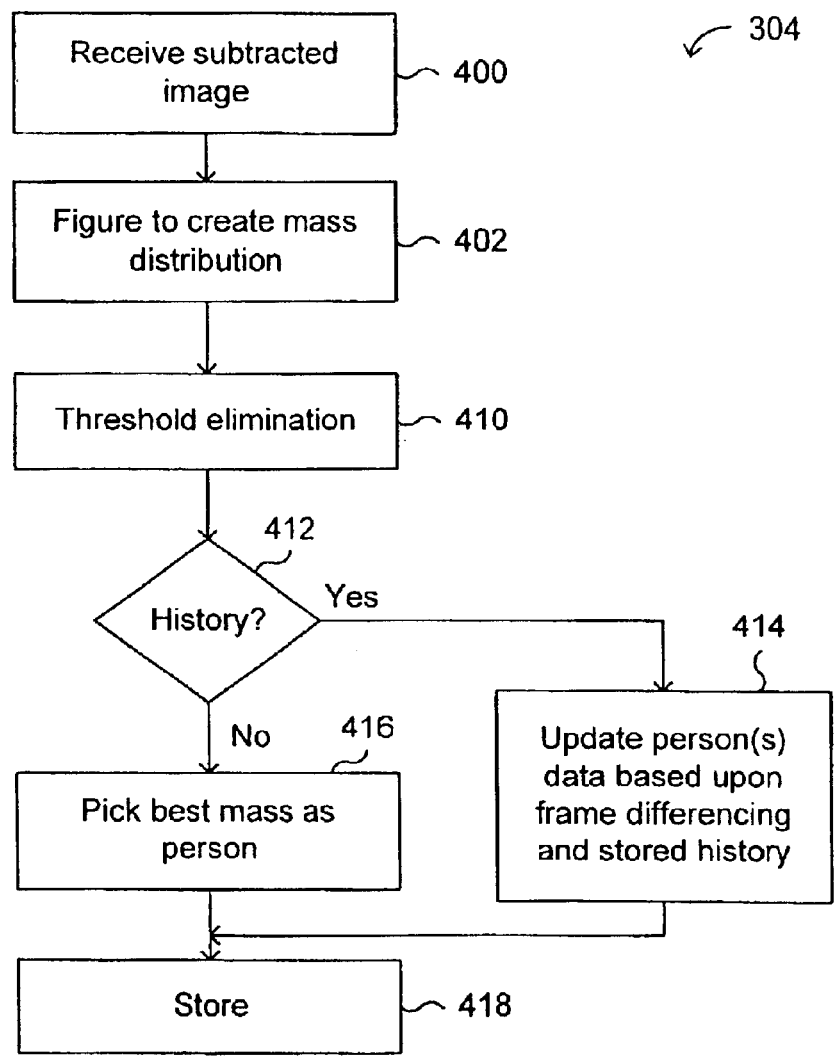
FIG. 4 illustrates a flow chart for a process of the present invention which carries out the scene parsing operation 304 of FIG. 3.

FIG. 4 illustrates a flow chart for a process of the present invention which carries out the scene parsing operation 304 of FIG. 3. As shown, in operation 400, the subtracted image, or foreground mask(s), is first received as a result of the background subtraction operation 300 of FIG. 3. Next, in operation 402, the foreground mask(s) is filtered using a conventional median filter to create a mass distribution map.

Figure 4A:
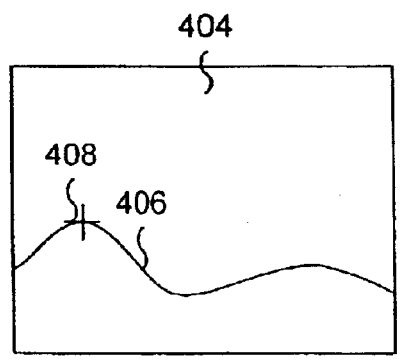

FIG. 4A is an illustration of a mass distribution 404 used in the scene parsing process of FIG. 4. As shown, the mass distribution 404 indicates a number of pixels, or a pixel density, along the horizontal axis of the display that do not represent the background image. In the mass distribution 404 of FIG. 4A, a curve 406 of the mass distribution 404 has a plurality of peaks 408 which represent high concentrations of pixels along the horizontal axis that do not correspond to the background image and, possibly, a person image or other objects.

With continuing reference to FIG. 4, in operation 410, portions of the mass distribution 404 are eliminated if they do not surpass a predetermined threshold. This ensures that small peaks 408 of the curve 406 of the mass distribution 404 having a low probability of being a person image are eliminated. Next, it is then determined whether a previous mass distribution 404, or history, is available in memory. Note decision 412.

If a history is available, the location and number of person images in the video images are identified based on a frame difference between the peaks 408 of a previous mass distribution and the peaks 408 of the current mass distribution 404, as indicated in operation 414.

On the other hand, if the history is not available in decision 412, the peaks 408 of the current mass distribution 404 are considered person images in operation 416. In any case, the location and number of person images that are assumed based on the peaks 408 of the mass distribution 404 are stored in operation 418. Further information may be found regarding scene parsing and locating person images in the video images in a U.S. patent application filed Jul. 30, 1999 with the title "SYSTEM, METHOD AND ARTICLE OF MANUFACTURE FOR DETECTING COLLISIONS BETWEEN VIDEO IMAGES GENERATED BY A CAMERA AND AN OBJECT DEPICTED ON A DISPLAY" which is incorporated herein by reference in its entirety. Once the person image(s) have been located in the video images generated by the camera, it then required that the head portion of each person image be located.

Figure 5:
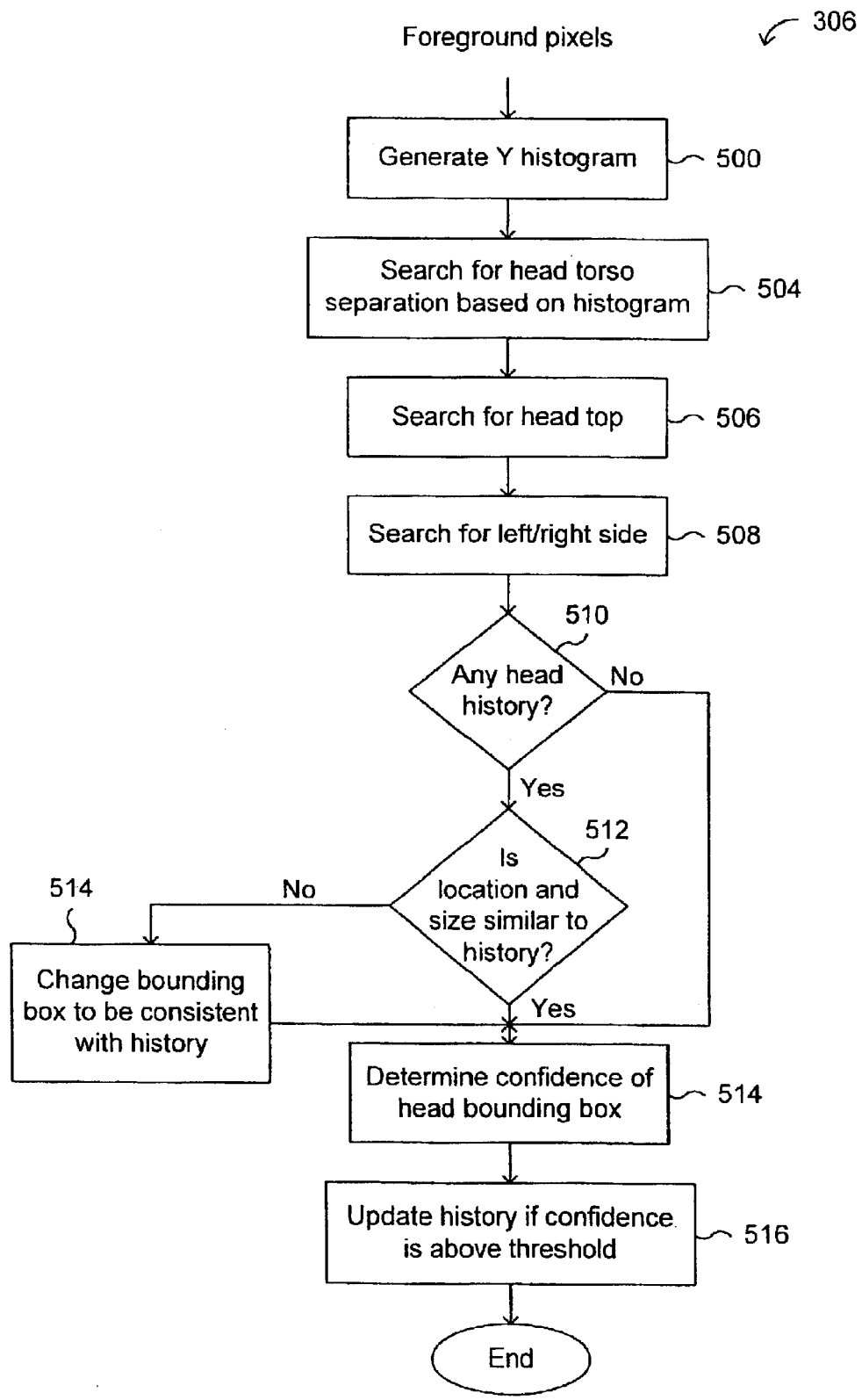
FIG. 5 illustrates a flow chart for a process of the present invention which carries out operation 306 of FIG. 3.
Figure 5A:
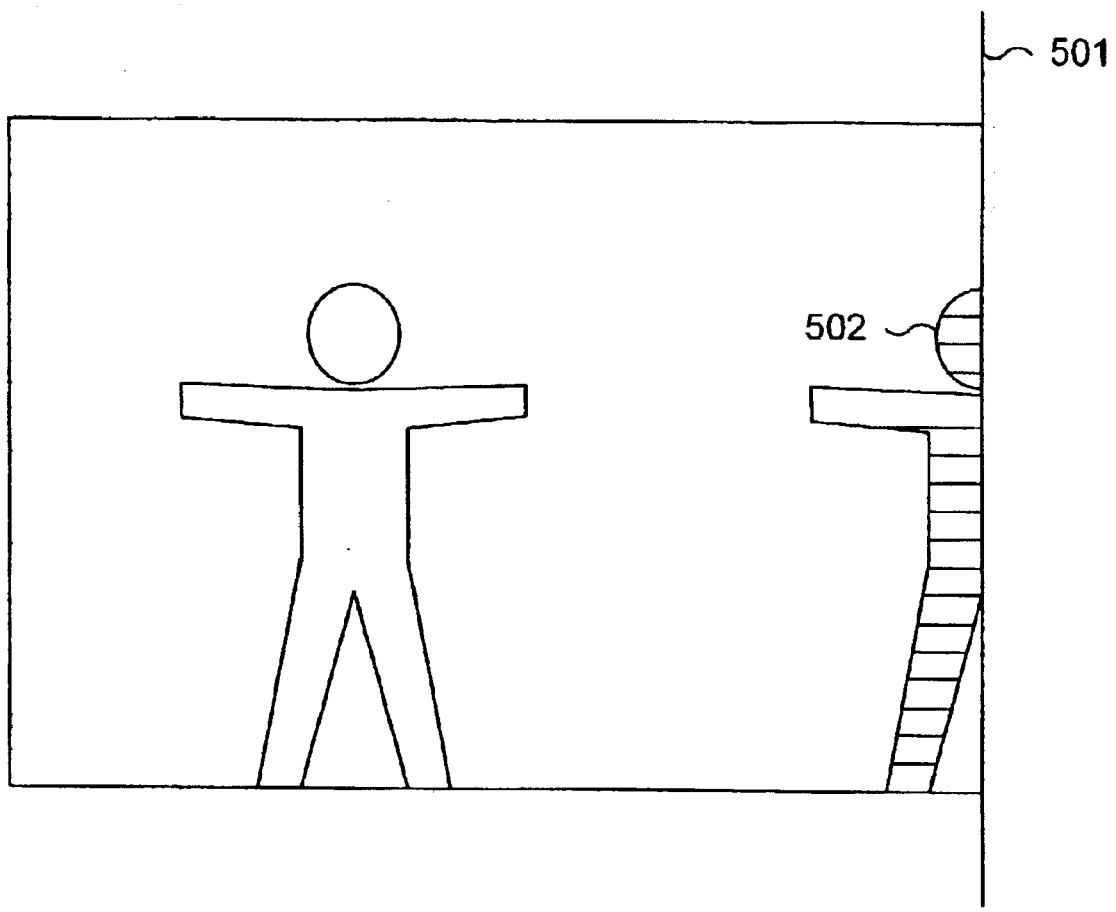
FIG. 5A is an illustration of a y-axis histogram generated in operation 500 shown in FIG. 5.

FIG. 5 illustrates a flow chart for a process of the present invention which carries out operation 306 of FIG. 3. Such process starts in operation 500 by generating a mass-distribution histogram that represents the extracted person image. FIG. 5A is an illustration of the histogram 501 generated in operation 500 shown in FIG. 5. For reasons that will soon become apparent, it is important that the histogram be formed along a y-axis.

With continuing reference to FIG. 5, a point of separation 502 (See FIG. 5A) is then identified in operation 504 between a torso portion of the person image and the head portion of the person image. Next, a top of the head portion of the person image is identified in operation 506. This may be accomplished by performing a search upwardly from the point of separation between the torso portion and the head portion of the person image. Subsequently, sides of the head portion of the person image are also identified in operation 508.

It is then determined in decision 510 whether any history exists with respect to the previous head size and location of each person image. Such history may take the form of previous head sizes and locations stored in memory. If it is determined in decision 510 that there is history, it is then determined in decision 512 whether the current head size and location is consistent with the historical head size and location, taking into account motion of the person image and a time duration between frames. If no consistency exists, it is assumed that the current head size and location is erroneous and a bounding box is generated based on the historical head size and location in operation 514. It should be noted that it is the bounding box that defines the estimated location and size of the head of the person image.

If, on the other hand, it is decided in operation 512 that the current head size and location is similar to the historical head size and location, or it is decided in operation 510 that there is no history, a confidence score associated with the head bounding box is generated based on mass distribution, shape, consistency with history, consistency with body proportions, etc. Note operation 514. It should be noted that the first confidence value associated with the first head tracking operation may be based at least in part on the foregoing confidence. After operation 514, the history is updated to include the current mass distribution if a confidence value of the head bounding box is above a predetermined threshold in operation 516.

Figure 6:
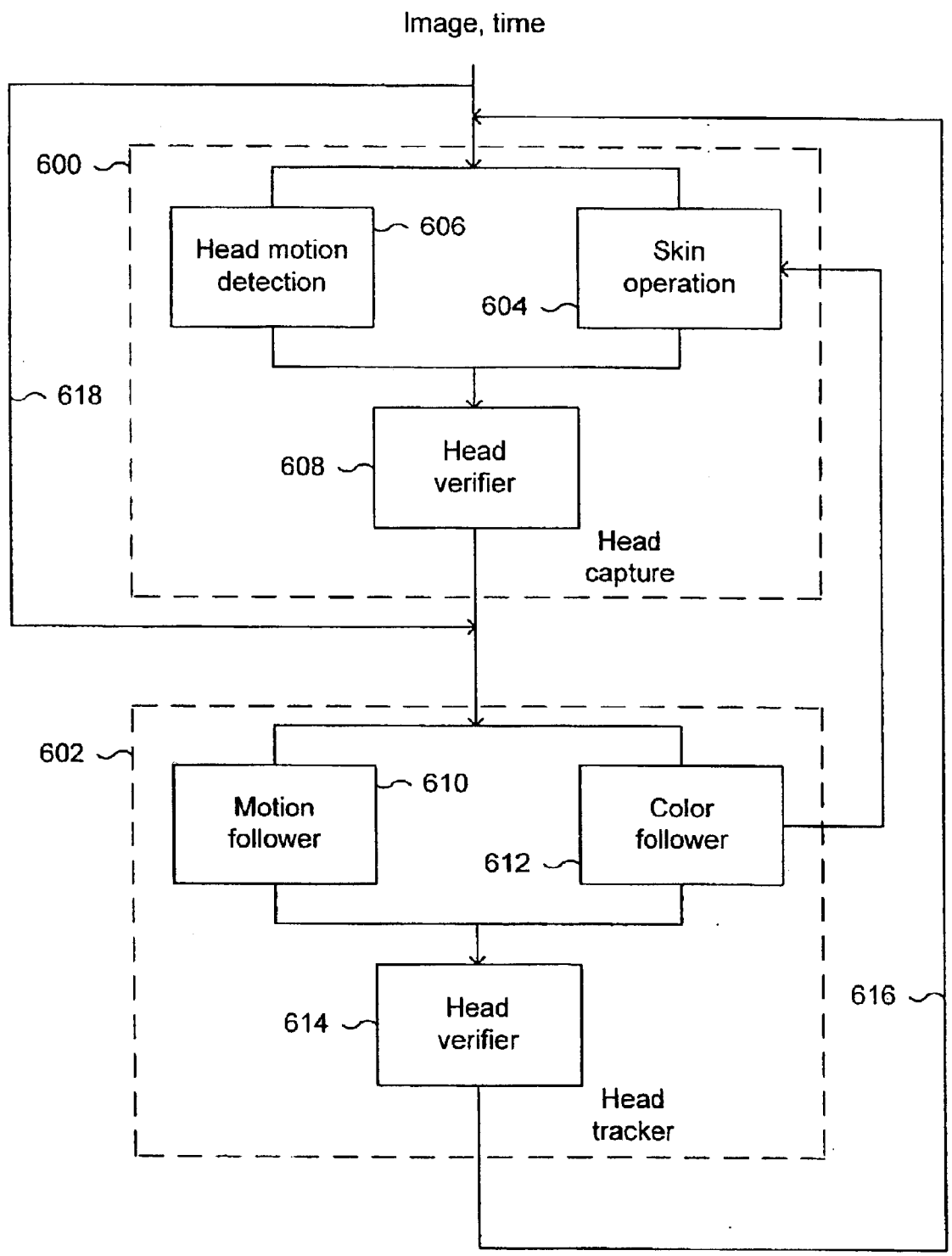
FIG. 6 shows a flow chart for a second head tracking operation that tracks a head portion of a person image in camera-generated video images using capture and tracker routines in accordance with one embodiment of the present invention.

FIG. 6 shows a flow chart for a second head tracking operation that tracks the head portion of the person image by way of a capture routine 600 and a tracker routine 602. As shown, the second head tracking operation may begin by identifying an initial location of the head portion of the person image in the camera-generated video images based on the detection of skin in operation 604. Further, the initial location may also be identified based on motion detection in operation 606. It should be noted that any other types of detection methods may be used in lieu of or in combination with the skin and motion detection operations.

Thereafter, a Support-Vector Networks (SVM) head verifier routine is executed in operation 608 in order to verify that the head portion has been identified after reviewing the detected parameters, e.g., motion, skin color, etc. Such verifier routine is commonly known to those of ordinary skill. Further, additional details regarding such operation may be found with reference to "Support-Vector Networks", by C. Cortes and V. Vapnik, in "Machine Learning", Vol. 20 (1995), pp. 273–297. which is incorporated herein by reference in its entirety.

Once the initial location of the head portion of the person image has been identified, or captured, the head tracker operation 602 is executed to continuously track a current location of the head portion of the person image. As shown in FIG. 6, the current location of the head portion of the person image may be tracked starting at the initial location based on motion in operation 610 and based on color in operation 612.

Similar to the head verifier operation 608 of the head capture routine 600, a head verifier routine is also executed in the head tracker routine 602 in operation 614 in order to verify that the current location head portion has been identified after reviewing the detected parameters, e.g., motion, skin color, etc. Again, such verifier routine is commonly known to those of ordinary skill. Further details regarding such operation may be found with reference to "Indexing Via Color Histograms", by M. J. Swain and D. H. Ballard, in Proceedings of 1990 International Conf. on Computer Vision, p. 390–393, which is incorporated herein by reference in its entirety.

During the course of the head tracker routine 602, the initial location of the head portion of the person image may be identified upon each instance that the second confidence value falls below a predetermined amount. By this feature, the tracking is "restarted" and the head portion of the person image is re-captured when the confidence that the head is being tracked correctly is low. This ensures improved accuracy during tracking. This feature is facilitated by a feedback loop 616 shown in FIG. 6. When the initial location of the head portion of the person image need not be identified, the head capture routine 602 may be skipped via path 618.

FIG. 7 shows a flow chart for a process of the present invention associated with the skin detection operation 604 of FIG. 6, wherein the initial location of the head portion of the person image may be identified based on the detection of a skin color in the video images. This may be accomplished by receiving a person image 700 (See FIG. 7A) and extracting a raw flesh map in operation 702. FIG. 7B illustrates an example of a flesh map 704 which is generated using the person image 700 of FIG. 7A.

With continuing reference to FIG. 7, the flesh map is filtered using a conventional median filter in operation 706. Next, in operation 708, distinct regions of flesh color on the flesh map are identified using a standard "connected components algorithm" or any other desired technique. Such regions may then be stored in a list which includes information on each of the regions, e.g. size, neighboring region, etc.

Outputs of operations 706 and 708 are subsequently used to fill holes in the regions with the flesh color of the surrounding region in operation 710. Such holes are areas which are fully encompassed by the regions and that do not exhibit the flesh color. FIG. 7C illustrates a flesh map, as outputted from the fill holes operation 710 of FIG. 7.

Thereafter, in operation 712, regions of the flesh color are selected, or extracted, that exceed a predetermined minimum size. Upon selection, the aforementioned list is updated to reflect only the selected regions. Next, the regions are combined, or logically associated into a group, based on a proximity of the regions to other regions and the resulting shape of the regions when combined. See operation 714. Again, the list is updated to reflect only the combined regions. FIG. 7D illustrates a flesh map with combined regions 715, as outputted from the combine regions operation 714 of FIG. 7.

With the regions combined, the associated list is used to generate a hypothesis as to which of the regions represents a head portion of a corresponding person image in operation 716. Further details regarding operation 716 will be set forth in greater detail hereinafter with reference to FIG. 8. After the hypothesis is generated, the hypothesis is evaluated in operation 718.

Figure 8:
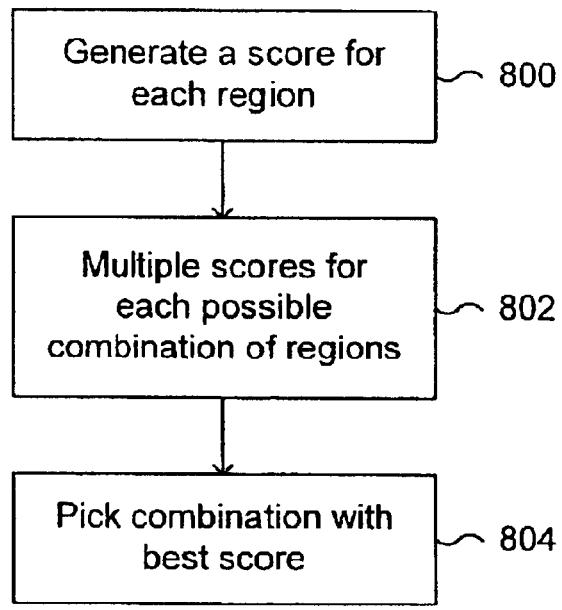
FIG. 8 illustrates a flow chart for a process of the present invention associated with the generate hypothesis operation 716 of FIG. 7.

FIG. 8 illustrates a flow chart for a process of the present invention associated with the hypothesis generation operation 716 of FIG. 7. As shown, such process begins in operation 800 by generating a score for each region using the list, as edited in operation 714 of FIG. 7. In other words, the regions of flesh color on the flesh map are ranked. Such ranking is based at least partly on a degree of similarity between the regions and a predefined oval. In one embodiment, such oval may have a 3/2:1 height to width ratio.

Next, in operation 802, the regions are combined in every possible permutation. The scores for the regions of each permutation are then multiplied to render resultants scores used to select which region represents the head portion of the person image.

Figure 9:
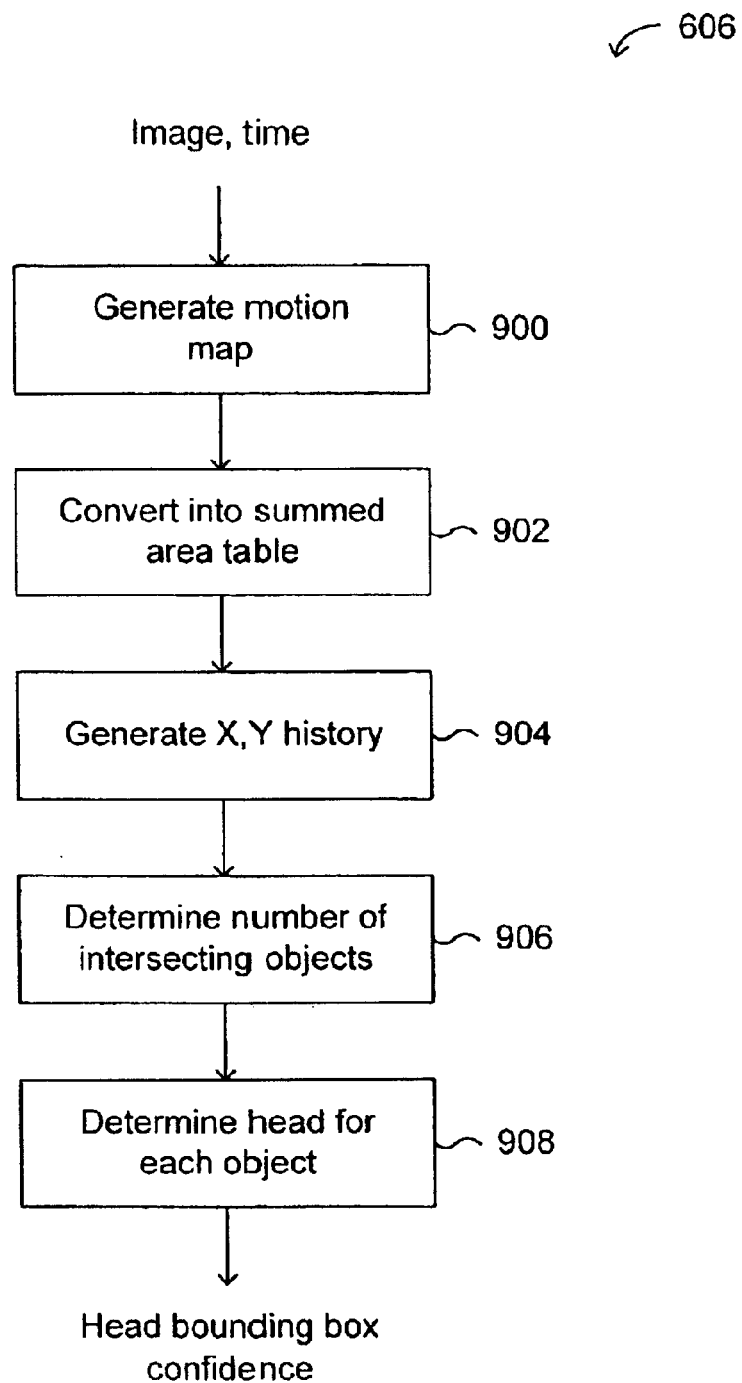
FIG. 9 shows a flow chart for a process of the present invention associated with the motion detection operation 606 of FIG. 6.

FIG. 9 shows a flow chart for a process of the present invention associated with the motion detection operation 606 of FIG. 6. As shown, in operation 900, a motion distribution map is first generated from the video images. In a preferred embodiment, the motion distribution map is converted into a summed-area table for acceleration purposes in operation 902. Further information may be found on summed-area tables with reference to F. C. Crow. Summed-area tables for texture mapping. Computer Graphics, 18(3), 207–212 (1984) which is incorporated herein by reference in its entirety.

With continuing reference to FIG. 9, a histogram is then generated that is similar to that shown in FIG. 5A with the exception of the addition of a component along the x-axis. Note operation 904. A number of objects resembling a head portion of a person image are then identified from the histogram in operation 906. Exemplary criteria used for such identification includes peaks in the histogram. A "best fit" is then found amongst the identified objects in operation 908.

Figure 10:
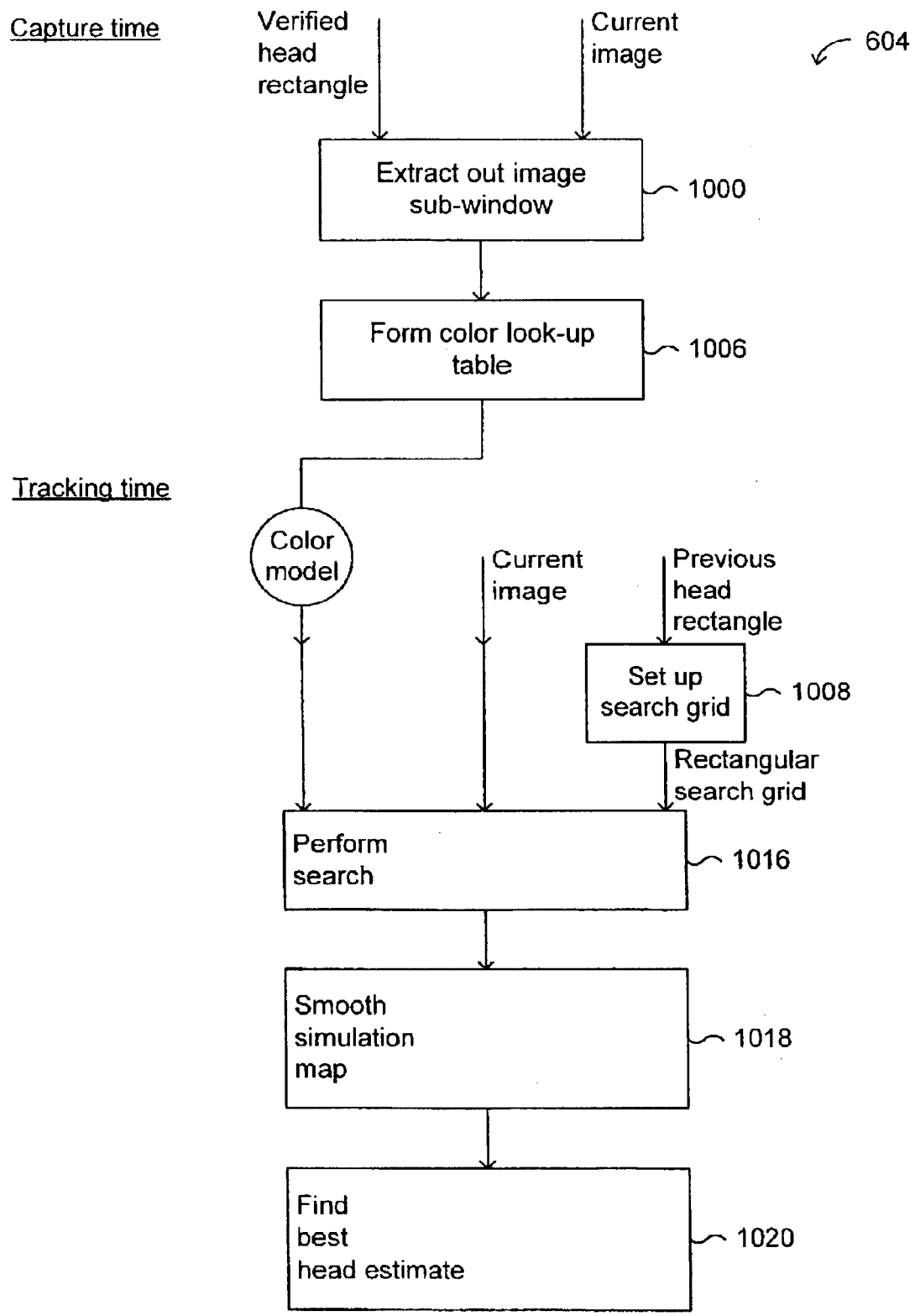
FIG. 10 shows a flow chart for a process of the present invention associated with the color follower operation 604 of FIG. 6.
Figure 10C:
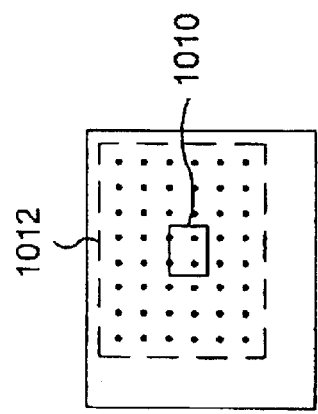
FIG. 10C is an illustration of a previous verified head rectangle and a search grid generated therefrom in operation 1009 of FIG. 10.
Figure 10B:
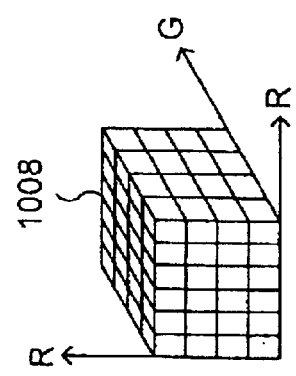
FIG. 10B shows an RGB histogram of the present invention outputted for each pixel within the image sub-window of FIG. 10B as a result of operation 1006 of FIG. 10.
Figure 10A:
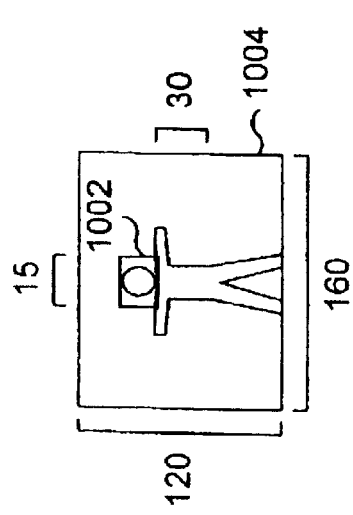
FIG. 10A illustrates a sub-window of the present invention associated with operation 1000 of FIG. 10.

FIG. 10 shows a flow chart for a process of the present invention associated with the color follower operation 612 of FIG. 6. Upon receipt of a current image and a verified head rectangle from the head verifier operation 608 of FIG. 6, an image subwindow is selected within the verified head rectangle in operation 1000. FIG. 10A illustrates a sub-window 1002 of a size of 15×20 pixels which is arbitrarily smaller than the associated current image 1004 which has a size of 120×160 pixels.

A histogram is then generated based on the contents of the image sub-window 1002 in operation 1006. FIG. 10B shows an RGB histogram 1008 outputted for each pixel within the image sub-window 1002 as a result of operation 1006. In order to condense the histogram 1008, each axis may be divided into uniform increments to form multiple intervals. In one embodiment, each axis may have 16 intervals between 0–255. The histograms of the pixels may then be used to construct a look-up table, or color model, which indicates in which interval the R,G, and B components of each pixel exists.

Next, in operation 1009, a previous verified head rectangle is used to set up a search grid. FIG. 10C is an illustration of the previous verified head rectangle 1010 and the search grid 1012. The search grid 1012 is generally larger than the previous verified head rectangle 1010. Such size difference is governed by a rate at which the camera accepts images and a potential amount of movement of the person image during the intervals between the images.

With continuing reference to FIG. 10, the color model, the current image, and the search grid are used to perform a search in operation 1016. Such search identifies a window within the search grid 1012 that best matches the color model. A raw similarity map is generated based on the contents of the best matching window. Once the best matching window is selected, it is smoothed in operation 1018. Finally, a portion of the raw similarity map that has the best score is chosen as the best head estimate in operation 1020 after which a confidence is generated. Such confidence is indicative of a certainty that the head is being tracked correctly based on a shape of a peak of the smooth similarity map that corresponds to the best head estimate. It should be noted that the second confidence value associated with the second head tracking operation may be based at least in part on the foregoing confidence. Additional details will be set forth regarding the foregoing "tracker" operations hereinafter with reference to FIG. 11.

It should be noted that the "capture" operations 1000–1006 are carried out on average once every 30 frames. In contrast, the following "tracker" operations 1008–1020 are repeated every frame using the latest color model from the "capture" operations 1000–1006. While the "capture" operations 1000–1006 are carried out on average once every 30 frames, such operations are repeated based on an ability of the "tracker" operations 1008–1020 to function properly.

Figure 11A:
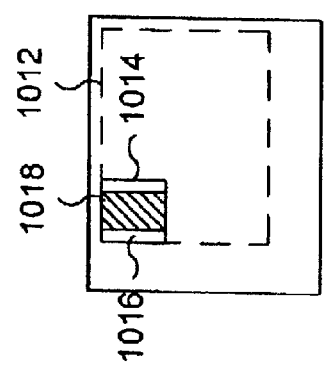
FIG. 11A shows the search grid and the areas involved with the process of FIG. 11.
Figure 11:
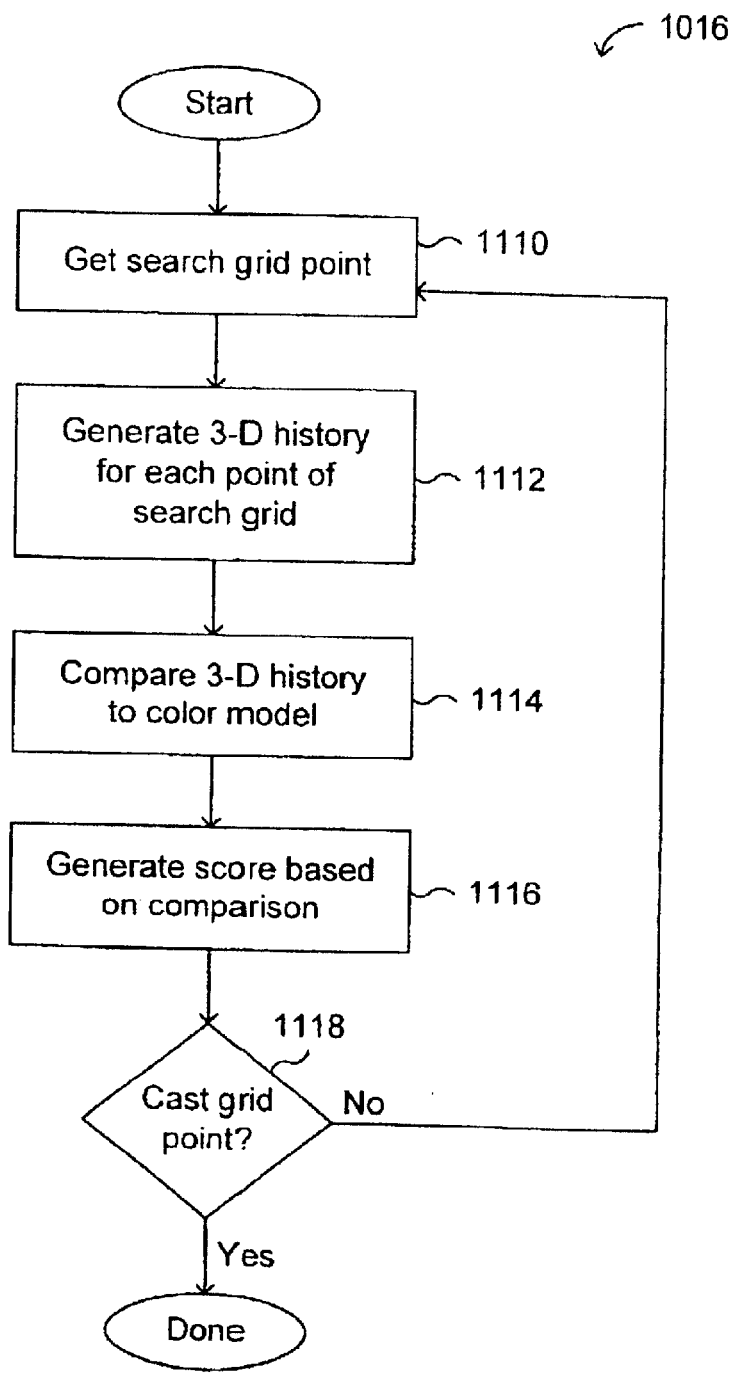
FIG. 11 shows a flow chart for a process of the present invention associated with the perform search operation 1016 of FIG. 10.

FIG. 11 shows a flow chart for a process of the present invention associated with the perform search operation 1016 of FIG. 10. As shown, a grid point is first selected within the search grid in operation 1110. Thereafter, in operation 1112, a 3-D histogram is then generated for each point of the search grid. Such 3-D histogram corresponds to a rectangle within the search grid with the selected grid point at a corner thereof. Each of the foregoing 3-D histograms is then compared to the color model in operation 1114 after which a score is assigned to the histogram in operation 1116. This procedure is continued until it is decided in operation 1118 that all of the grid points have been selected. As mentioned earlier with reference to FIG. 10, the histogram with the greatest score is considered the best head estimate.

FIG. 11A shows the search grid 1012, and the areas 1104 in which the 3-D histograms are generated. As shown, areas 1014 of adjacent grid points 1016 have an overlapping portion 1018. In a preferred embodiment, the histogram is generated only once for each overlapping portion 1018 to incur a significant processing time savings.

Figure 12:
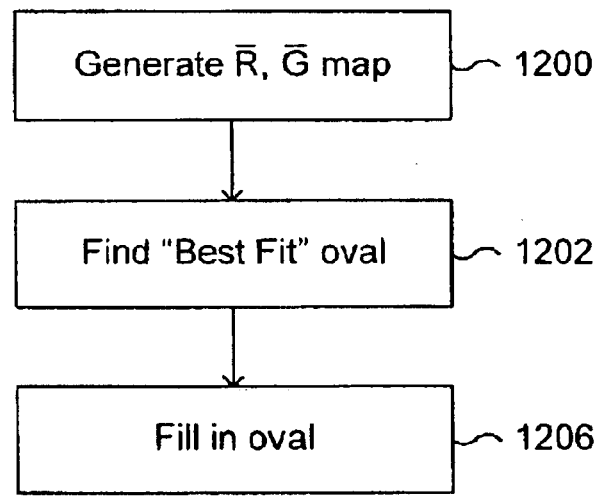
FIG. 12 illustrates a flow chart for a process of the present invention associated with a feedback process between the color follower operation 612 and the skin detection operation 604 of FIG. 6.

FIG. 12 illustrates a flow chart for a process of the present invention associated with a feedback process between the color follower operation 612 and the skin detection operation 604 of FIG. 6. In particular, while tracking the current location of the head portion of the person image in operation 702 of FIG. 7, a flesh map may be obtained in operation 1200. Ideally, the flesh map generated in the present process is only a two-dimensional map R and G, where $|R|=R/(R+G+B)$ and $|G|=G/(R+G+B)$. Thereafter, in operation 1202, a "best-fit" oval is found in the two-dimensional flesh map. Noise in the form of dots outside boundaries of the oval are therefore removed. The oval is then filled in operation 1206. At this point, the flesh map is adapted to be fed back from the color follower operation 612 to the skin capture operation 604 via a feedback 1208 shown in FIG. 7.

It should be noted that the process of FIG. 12 is executed during a first cycle of the second head tracking operation. Further, the process may be may be used repeatedly during subsequent identification of an initial location of the head portion when the associated confidence level drops below a predetermined amount.

Figure 13:
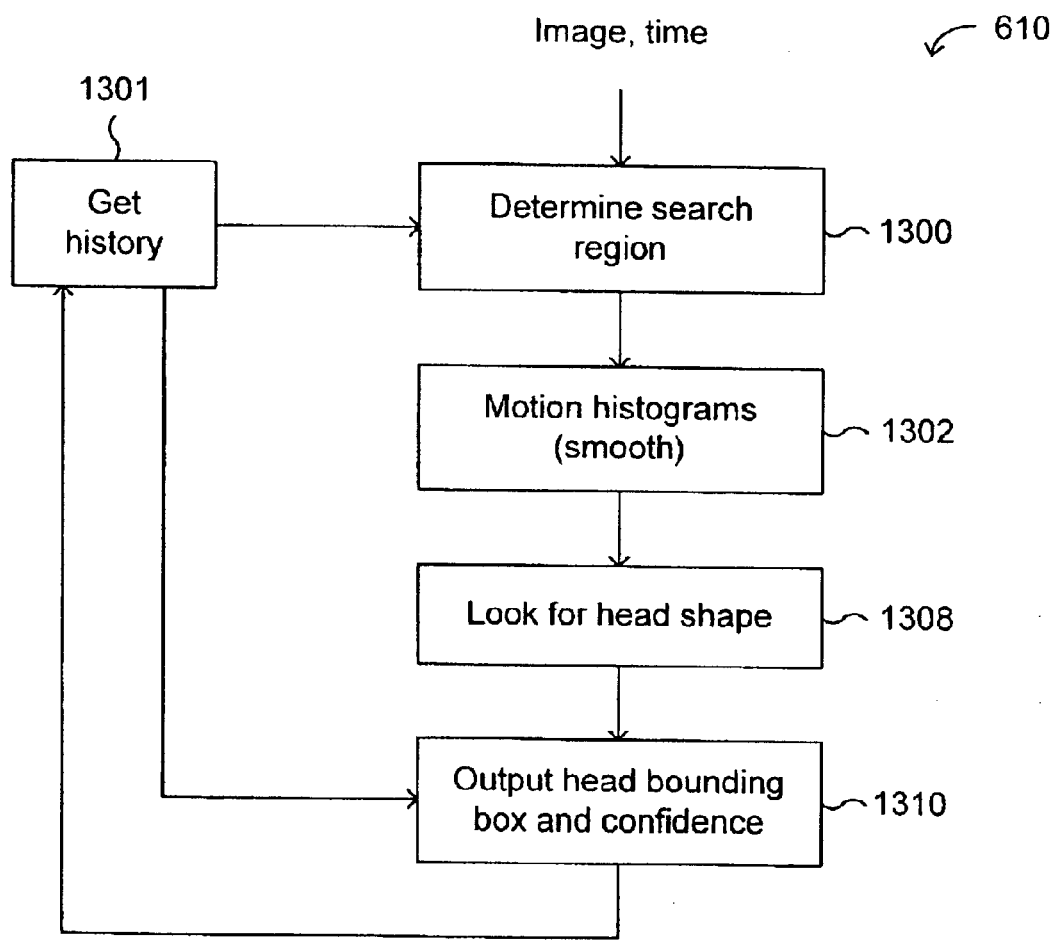
FIG. 13 shows a flow chart for a process of the present invention associated with the motion follower operation 610 of FIG. 6.

FIG. 13 shows a flow chart for a process of the present invention associated with the motion follower operation 610 of FIG. 6. As shown, the current location of the head portion of the person image may be tracked based on the detection of motion in the video images. This may be accomplished by first determining a search window based on a previous location of the head portion of the person image in operation 1300. This is accomplished in a manner similar to that in which the search window shown in FIG. 10C is generated in operation 1000 of FIG. 10. It should be noted that the previous location may be stored in a history 1301.

Next, a motion distribution map is created within the search window in operation 1302. A y-axis histogram is then generated based on the distribution motion map. Ideally, the histogram is smoothed before identifying areas of motion. In operation 1308, at least one of the areas of motion is selected as being the initial location of the head portion of the person image. Selection is governed by multiple factors including a position of the motion, proportions of the motion, and the position of the motion relative to other motion. The more of such factors that indicate a motion is a head, the higher the confidence and certainty that the head is being judged correctly. If such confidence is sufficient, the history 1301 may be updated with the current bounding box that is outputted. It should be noted that the second confidence value associated with the second head tracking operation may be based at least in part on the foregoing confidence.

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present include all such alternatives, modifications, permutations, and equivalents.

What is claimed is:

1. A method of tracking a head of a person image in video images comprising:
    identifying an initial location of a point of separation between a torso portion and a head portion of the person image in the video images;
       tracking a current location of the point of separation between the torso portion and the head portion of the person image starting at the initial location;
       generating a confidence value representative of a confidence that the current location of the point of separation between the torso portion and the head portion of the person image in the video images is correct; and
       identifying the initial location of the point of separation between the torso portion and the head portion of the person image upon each instance that the confidence value falls below a predetermined amount.

2. The method of claim 1, wherein the initial location of the point of separation between the torso portion and the head portion of the person image is identified based on the detection of a skin color in the video images.

3. The method of claim 1, wherein the current location of the point of separation between the torso portion and the head portion of the person image is tracked based on the detection of a skin color in the video images.

4. The method of claim 1, wherein the initial location of the point of separation between the torso portion and the head portion of the person image is identified based on the detection of motion in the video images.

5. The method of claim 1, wherein the current location of the point of separation between the torso portion and the head portion of the person image is tracked based on the detection of motion in the video images.

6. A computer program embodied on a computer readable medium for tracking a head of a person image in video images comprising:
    a code segment for identifying an initial location of a point of separation between a torso portion and a head portion of the person image in the video images;
    a code segment for tracking a current location of the point of separation between the torso portion and the head portion of the person image starting at the initial location;
    a code segment for generating a confidence value representative of a confidence that the current location of the point of separation between the torso portion and the head portion of the person image in the video images is correct; and
    a code segment for identifying the initial location of the point of separation between the torso portion and the head portion of the person image upon each instance that the confidence value falls below a predetermined amount.

7. A method of tracking a head of a person image in video images comprising:
    identifying an initial location of a point of separation between a torso portion and a head portion of a person image in video images;
    tracking a current location of the point of separation between the torso portion and the head portion of the person image starting at the initial location;
    obtaining a flesh map while tracking the current location of the point of separation between the torso portion and the head portion of the person image; and
    using the flesh map during subsequent identification of an initial location of the point of separation between the torso portion and the head portion of the person image.

8. A computer program embodied on a computer readable medium for tracking a point of separation between a torso portion and a head of a person image in video images comprising:
    a code segment for identifying an initial location of the point of separation between the torso portion and the head portion of a person image in video images;
    a code segment for tracking a current location of the point of separation between the torso portion and the head portion of the person image starting at the initial location;
    a code segment for obtaining a flesh map while tracking the current location of the point of separation between the torso portion and the head portion of the person image; and
    a code segment for using the flesh map during subsequent identification of a next initial location of a point of separation between the torso portion and the head portion of the person image.

9. A system for tracking a head portion of a person image in video images, comprising:
    a receiver for receiving video images;
    logic for executing a first head tracking operation for generating a first confidence value representative of a confidence that a head portion of a person image in the video images is located, the first head tracking operation comprising identifying a point of separation between a torso portion of the person image and the head portion of the person image;
    logic for executing a second head tracking operation for generating a second confidence value representative of a confidence that the head portion of the person image in the video images is located; and
    an output device for outputting the first confidence value and the second confidence value, wherein the depiction of the head portion of the person image in the video images is based on the first confidence value and the second confidence value.

10. The system of claim 9, wherein the logic for executing the first head tracking operation tracks the head portion of the person image in the video images using previous video images including the head portion of the person image.

11. The system of claim 9, wherein the logic for executing the first head tracking operation tracks the head portion of the person image in the video images using a mass distribution.

12. A system for tracking a head portion of a person image in video images, comprising:
   a receiver for receiving video images;
   logic for executing a first head tracking operation for generating a first confidence value representative of a confidence that a head portion of a person image in the video images is located;
   logic for executing a second head tracking operation for generating a second confidence value representative of a confidence that the head portion of the person image in the video images is located; and
   an output device for outputting the first confidence value and the second confidence value, wherein the depiction of the head portion of the person image in the video images is based on the first confidence value and the second confidence value; and
   wherein the logic for executing the first head tracking operation subtracts a background image from the video images in order to extract the person image, generates a histogram representing the extracted person image, and identifies a point of separation between a torso portion of the person image and the head portion of the person image.

13. The system of claim 12, wherein the logic for executing the first head tracking operation identifies a top of the head portion of the person image and the sides of the head portion of the person image.

14. The system of claim 13, wherein the logic for executing the first head tracking operation identifies the top of the head portion of the person image by performing a search upwardly from the point of separation between the torso portion and the head portion of the person image.

15. The system of claim 9, wherein the logic for executing the second head tracking operation identifies an initial location of the head portion of the person image in the video images and tracks a current location of the head portion of the person image starting at the initial location.

16. The system of claim 15, wherein the logic for executing the second head tracking operation identifies the initial location of the head portion of the person image upon each instance that the second confidence value falls below a predetermined amount.

17. The system of claim 15, wherein the logic for executing the second head tracking operation identifies the initial location of the head portion of the person image based on detecting a skin color in the video images.

18. The system of claim 17, wherein the logic for executing the second head tracking operation identifies the initial location of the head portion of the person image by extracting a flesh map, filtering the flesh map, identifying distinct regions of flesh color on the flesh map, ranking the regions of flesh color on the flesh map, and selecting at least one of the regions of flesh color as the initial location of the head portion of the person image based on the ranking.

19. The system of claim 18, wherein the logic for executing the second head tracking operation fills in holes in the regions of flesh color on the flesh map.

20. The system of claim 18, wherein the logic for executing the second head tracking operation combines regions of flesh color on the flesh map based on a predetermined criterion.

21. The system of claim 15, wherein the logic for executing the second head tracking operation tracks the current location of the head portion of the person image based on detecting a skin color in the video images.

22. The system of claim 21, wherein the logic for executing the second head tracking operation tracks the current location of the head portion of the person image by extracting a sub-window of the head portion of the person image in the video images, forming a color model based on the sub-window, searching the video images for a color similar to the color model, and estimating the current location of the head portion of the person image based on the search.

23. The system of claim 15, wherein the logic for executing the second head tracking operation identifies the initial location of the head portion of the person image based on detecting motion in the video images.

24. The system of claim 23, wherein the logic for executing the second head tracking operation identifies the initial location of the head portion of the person image by creating a motion distribution map from the video images, generating a histogram based on the motion distribution map, identifying areas of motion using the histogram, and selecting at least one of the areas of motion as being the initial location of the head portion of the person image.

25. The system of claim 15, wherein the logic for executing the second head tracking operation tracks the current location of the head portion of the person image based on detecting motion in the video images.

26. The system of claim 25, wherein the logic for executing the second head tracking operation identifies the current location of the head portion of the person image by determining a search window based on a previous location of the head portion of the person image, creating a motion distribution map within the search window, generating a histogram based on the distribution motion map, identifying areas of motion using the histogram, and selecting at least one of the areas of motion as being the initial location of the head portion of the person image.

27. A system for tracking a head portion of a person image in video images, comprising:
   a receiver for receiving video images;
   a processor for executing a head tracking operation for generating a confidence value representative of a confidence that a head portion of a person image in the video images is located, the head tracking operation comprising identifying a point of separation between a torso portion of the person image and the head portion of the person image; and
   a display for depicting the head portion of the person image in the video images based on the confidence value.

* * * * *